Figures 1, 2:
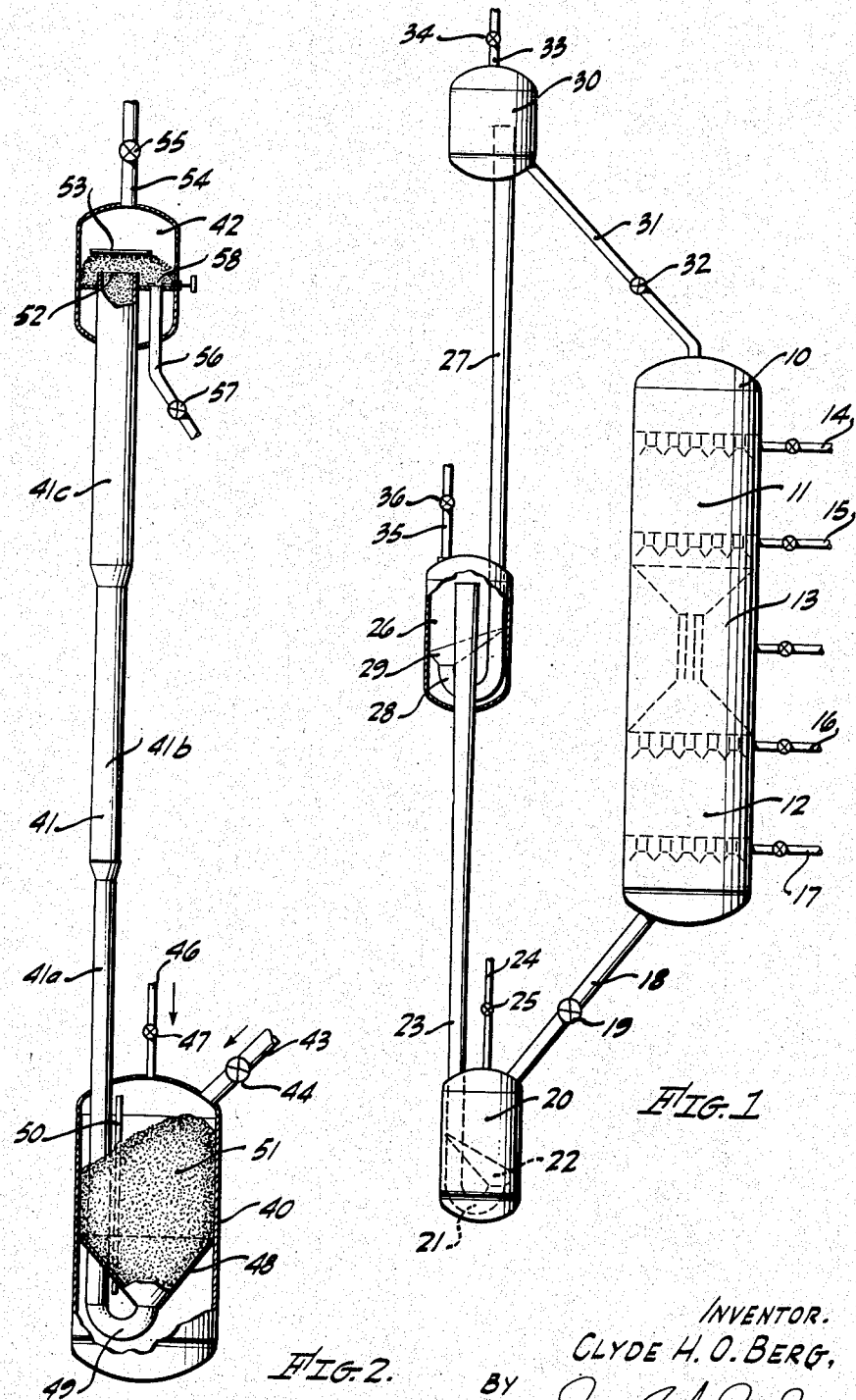

INVENTOR.
CLYDE H. O. BERG,
BY
AGENT.

July 27, 1954  C. H. O. BERG  2,684,872
CONVEYANCE OF GRANULAR SOLIDS
Filed March 13, 1950  2 Sheets-Sheet 2

INVENTOR.
CLYDE H.O. BERG,
BY
AGENT.

Patented July 27, 1954

2,684,872

UNITED STATES PATENT OFFICE 2,684,872

CONVEYANCE OF GRANULAR SOLIDS

Clyde H. O. Berg, Long Beach, Calif., assignor to Union Oil Company of California, Los Angeles, Calif., a corporation of California Application March 13, 1950, Serial No. 149,322

28 Claims. (Cl. 302—53)

This invention relates to the conveyance or transportation of granular solids and in particular relates to a process and apparatus for the movement of such solids in substantially compact form as a continuous moving phase through a conduit under the influence of a cocurrently depressuring conveyance fluid.

The movement of granular solids in appreciably large quantities presents a technical problem in many industrial operations such as the movement of cracking catalysts in the well known T. C. C. and fluid cracking processes, the conveyance of sand from tar sand retorting processes, the movement of ores and coal in metallurgical operations, and in many other industrial processes in which large quantities of granular solids are employed. Problems are encountered particularly when granular solids must be transported continuously at high volumetric flow rates, or under pressure, or under conditions where losses of the solids due to attrition or abrasion must be minimized to prevent an economic disadvantage. Such conditions are pronounced in the transportation of expensive granular catalysts which are required to be circulated at rates of as high as 800 to 1,000 tons per hour as, for example, in catalytic cracking processes employing catalyst-to-oil ratios as high as about 10 to 15 or higher.

Conventionally granular solids are conveyed by moving mechanical equipment such as bucket elevators, the various forms of belt conveyors and other apparatus such as open or enclosed drag lines. For atmospheric pressure operations such mechanical equipment adequately serves to transport the granular solids at moderate rates. However, when the solids are desirably transported at high flow rates, or in connection with processes in which fluids under pressure contact the granular solids, or in processes where the attrition loss of granular solids must be kept at a minimum, numerous disadvantages of such mechanical conveyances present themselves. Among these problems is the size of the equipment necessary to transport large quantities of granular solids. For example, bucket elevators necessary to transport cracking catalysts at a rate of about 150 tons per hour are approximately 4 feet in length, 1 foot in width, and 1½ feet deep. Furthermore the maintenance of the necessary driving mechanism at temperatures of the order of those in the cracking processes is difficult and expensive. Furthermore, the quantity of granular solids lost by attrition in loading and unloading the buckets is frequently excessive.

It is therefore an object of the present invention to provide an improved method for the conveyance of granular solids through relatively small sized equipment at relatively high volumetric flow rates without the disadvantages inherent in moving mechanical conveyors.

It is an additional object of this invention to provide a method for the conveyance of granular solids in which no movement of mechanical equipment is employed and the conveyance is effected by a depressuring cocurrent flow of a conveyance fluid through a conduit carrying the granular solids in substantially compact form.

It is a particular object of the present invention to provide a special inlet section to such a conveyance conduit whereby increased flow rates over those heretofore obtained are now possible and in which the granular solids flow by gravity into the inlet section and are redirected therein from the direction of gravity flow into the direction of flow in the conveyance conduit.

A further object of the present invention is to provide an apparatus for the conveyance of granular solids which permits the realization of the aforementioned objects.

Other objects and advantages of the present invention will become apparent to those skilled in the art as the description thereof proceeds.

Briefly, the present invention comprises a process for the conveyance of granular solids in which a conveyance conduit is established which may be vertical or disposed at any other angle and which is provided at its inlet opening with a special inlet section adapted to the introduction of granular solids thereinto by means of a gravity flow. The granular solids flow as a substantially compact continuous moving mass by gravity into the inlet opening of the inlet section cocurrently with a depressuring conveyance fluid. Assisted by the conveyance fluid the granular solids are redirected within the inlet section and introduced directly into the conveyance conduit moving in the same direction as the solids are to be conveyed through the conduit. Once within the conveyance conduit the major part of conveyance fluid depressuring takes place whereby the pressure drop generated by the conveyance fluid flow through the interstices present in the compact mass of granular solids generates a conveying force in the direction of conveyance fluid flow tending to move the solids in that direction. The ratio of the conveyance force to the gravitational force may be expressed as:

$$\frac{\frac{dp}{dl}}{\rho g \cos \theta}$$

wherein $$\frac{dp}{dl}$$

is the pressure drop of the conveyance fluid per unit length of conveyance zone in poundals per square foot per foot, $\rho$ is the bulk density of the solids, $g$ is the acceleration of gravity in feet per second per second, and $\theta$ is the angular deviation of the conveyance zone from the vertical. A sufficiently high conveyance fluid flow is maintained whereby a conveyance force is generated of a magnitude sufficient to counteract the opposing forces of gravity. When this conveying force is exceeded and a conveyance force ratio of over 1.0 results, the gravitational forces are neutralized and the solids tend to move through the conduit as a substantially compact continuous solids phase and do so move when the friction forces of the solids on the walls of the conveyances conduit are also neutralized by the conveyance forces. A conveyance force ratio value of between about 1.0 and 1.5 is usually sufficient to overcome gravity and friction forces.

In order to maintain the granular solids in a compact condition some sort of a thrust force or restriction is placed upon the granular solids discharging from the conveyance zone. This may be done in one of several ways including the disposition of a transverse plate spaced adjacent the discharge opening of the conveyance conduit, by placing a mesh in the conduit or by surrounding the discharge opening with a suitable expansion chamber partially filled with solids and in which the conveyance force ratio is maintained at a value insufficient to convey the granular solids, i. e. less than 1.0. In either case the restriction serves to limit the solids discharge rate from the conveyance conduit to a value less than the maximum posisble solids conveyance rate in the conveyance conduit for the existing value of the conveyance force ratio thereby retaining the granular solids in their compact condition throughout the extent of the inlet section, the conveyance section and the expansion chamber.

The conveyance force generated by the depressuring conveyance fluid is desirably maintained at as constant a value throughout the length of the entire conveyance apparatus as possible. The effect of so maintaining the operation is to minimize solids friction on the walls of the conveyance conduit and to reduce to a minimum the necessary conveyance fluid pressure required at the solids inlet end of the apparatus. The conveyance fluid may be either a liquid or a gas and since the expansion properties of these fluids are different the physical form which the conveyance conduit takes in order to maintain a substantially constant conveyance force is considerably different in the case of gaseous fluids than in the case of liquid fluids.

The pressure drop of the conveyance fluid is a direct measure of the conveyance force generated and with viscous flows of conveyance fluid a pressure drop proportional to the first power conveyance fluid velocity is obtained, whereas, with turbulent flow the pressure drop is proportional to the conveyance fluid velocity squared. In the case of a depressuring liquid wherein the coefficient of a volumetric expansion with pressure is low the change in fluid velocity is very low and the conveyance force is substantially constant throughout the length of a conveyance conduit having a uniform cross sectional area. However, with gaseous fluids a partial expansion takes place upon depressuring which results in rapid velocity increases so that in a conduit of uniform cross sectional area the velocity or pressure drop and the conveyance force are all greater at or near the discharge opening of the conveyance conduit than at the inlet opening.

Therefore in accordance with the present invention, when gaseous conveyance fluids are employed the cross sectional area of the conveyance conduit is preferably increased in the direction of granular solids flow sufficiently to maintain the conveyance force reasonably constant throughout the length of the conveyance conduit. This may be done by fabricating a tapered conduit having a gradually increasing cross sectional area with distance from the inlet opening or by using a conduit consisting of a series of connected cylindrical sections of successively increasing cross sectional area which may be joined by means of swages. In each of such sections the conveyance force rises somewhat only to be decreased upon passing from one section to the next larger section.

It is further possible to maintain this substantially constant conveyance force by removing a portion of the conveyance fluid at one or a series of points along the length of the conveyance conduit thereby maintaining the conveyance force ratio and the fluid velocity at a more or less uniform value.

In cases where the granular solids are to be transported to great heights a combination of the two aforementioned methods may be employed; namely, the use of a conveyance conduit having a series of cylindrical sections or a tapered conduit and in which at a plurality of points along the length of the conveyance conduit outlets for conveyance fluid are provided. Desirably fluid removed from these successive outlets is returned for recompression and reintroduction into the inlet opening of the conveyance conduit.

Referring now more particularly to the inlet sections referred to above, it has been found that as high as a fifteen-fold increase in the flow rate of granular solids in a conveyance apparatus according to this invention is permissible by using an inlet section communicating with the conveyance conduit at its inlet end which is adaptable to the gravity flow of granular solids to be conveyed into the inlet section. The exact reason for this is not understood for based on a cross sectional area of inlet opening it would be expected that little or no granular solids flow rate increase would result. It has been found, however, that under analogous conditions the transportation rate of granular cracking catalyst in a 3-inch cylindrical conduit may be increased from as low as 2400 pounds per hour to as high as 36,000 pounds per hour by the use of an inlet section adapted to the gravity introduction of solids. This will be more clearly pointed out in connection with the drawings.

It has not heretofore been possible to convey granular solids at such high rates through such small equipment and the conveyance of 18 to 20 tons of granular solids per hour through a 3-inch conduit is appreciably larger, of the order of two or three times, than the flow rate of the granular solids passing by force of gravity alone through the same size conduit. It is apparent from the foregoing that the method and apparatus of the present invention have permitted the realization of somewhat unusual results in the conveyance of granular solids.

Figure 4:
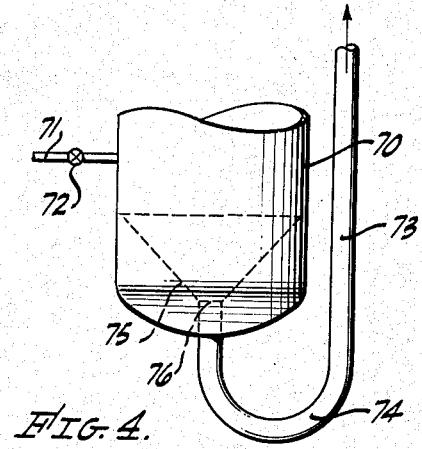
Figure 3:
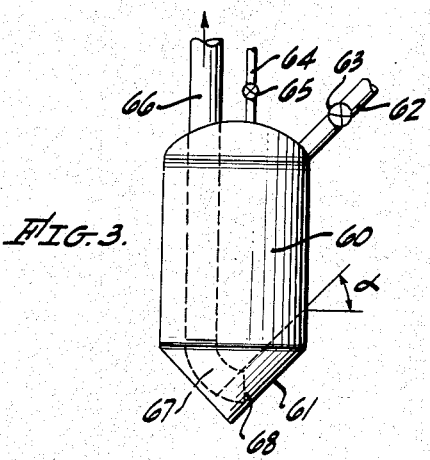
Figure 6:
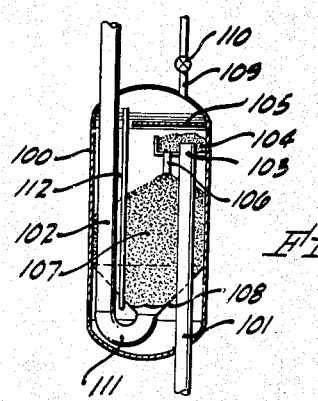
Figure 5:
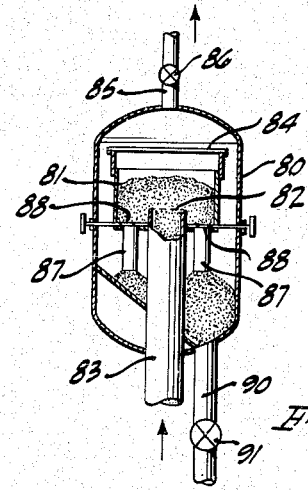
Figure 7:
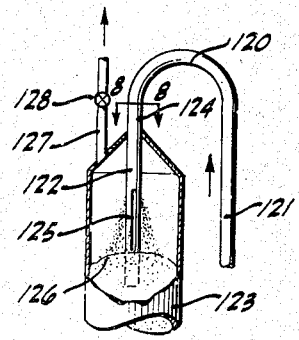
Figure 8:
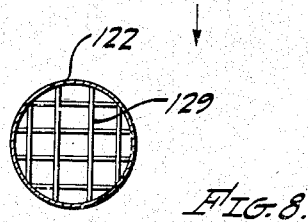

The present invention will be more clearly understood from the description of the drawings in which:

Figure 1 shows a modification of the conveyance apparatus of this invention operated to circulate granular solids through a contacting vessel, Figure 2 shows a second modification of the conveyance apparatus, as an elevation view and in partial cross section, Figure 3 and Figure 4 show detail elevation views of the inlet section of the conveyance apparatus, Figure 5 shows a detail elevation view of the discharge opening of the conveyance apparatus, Figure 6 shows a detail elevation view of an intermediate pressuring vessel also shown in Figure 1 and in which a combination conveyance inlet zone and conveyance zone outlet is incorporated in a single vessel, and Figures 7 and 8 show a modification of the discharge outlet of the improved conveyance apparatus of this invention.

Referring now more particularly to Figure 1, contacting vessel 10 is provided with upper contacting zone 11 and lower contacting zone 12 separated by sealing zone 13. Typical of such contacting vessels are the smaller catalytic cracking towers in which, for example, a hydrocarbon distillate is passed by means of conduits 14 and 15 into a catalytic cracking zone 11 forming a cracked distillate and a spent carbonaceous catalyst. The spent catalyst subsequently passes through sealing zone 13 into regeneration zone 12 through which a regeneration gas containing oxygen is passed via conduits 16 and 17. The regenerated catalyst is withdrawn via transfer line 18 at a rate controlled by valve 19 and introduced into induction chamber 20. The induction chamber here shown is the same type shown in greater detail in Figure 2 and employs a return bend inlet zone 21, and funnel inlet 22 communicating with lower conveyance zone 23. Thus granular solids are introduced into induction chamber 20 and a conveyance fluid under pressure is introduced via line 24 controlled by valve 25. Lower conveyance zone 23 discharges into intermediate pressuring vessel 26 which also contains the inlet opening of upper conveyance zone 27, return bend inlet section 28 and funnel 29. Upper conveyance zone 27 discharges into separator zone 30 from which granular solids are transported through transfer line 31 controlled by valve 32 for reintroduction into contact vessel 10. Outlet line 33 controlled by valve 34 is provided in separator zone 30. Conduit 35 controlled by valve 36 is provided in intermediate pressuring vessel 26. Thus in operation by means of conduit 35 the pressure within intermediate pressuring vessel 36 is alternately raised and lowered above and below the pressures existing in induction chamber 20 and separation chamber 30 so that alternately the lower conveyance zone discharges solids into intermediate pressuring vessel 26 followed by the discharge of granular solids from intermediate pressuring vessel 26 into separator chamber 30. If desired two or more such lower and upper conveyance zones and intermediate pressuring vessels may be used to provide a continuous transfer of granular solids from the bottom to the top of contacting vessel 20.

It is seen that in induction chamber 20 and intermediate pressuring vessel 26 the granular solids present therein flow by gravity into inlet sections 21 and 28, respectively, cocurrently with a depressuring conveyance fluid introduced into the respective vessels. It is due to this inlet flow of solids by gravity which permits the unusually high volumetric flow rates of granular solids in the relatively small conduits of this invention.

Referring now more particularly to Figure 2, a modification of the conveyance apparatus is shown in which no intermediate pressuring vessel is employed but which may be substituted for the conveyance apparatus shown in Figure 1. The essential vessels in the apparatus include induction chamber 40, conveyance conduit 41 comprising lower section 41a, intermediate section 41b, upper section 41c, and separator chamber 42. Inlet 43 controlled by valve 44 is provided for the introduction of granular solids to be conveyed into induction chamber 40. Inlet 46 controlled by valve 47 is provided for the introduction of the conveyance fluid under pressure. Near the bottom of the conveyance chamber 40 is provided funnel 48 communicating at its lower opening with return bend inlet zone 49 which serves to redirect granular solids into section 41a of conveyance conduit 41. A pressure equalizing tube 50 is provided communicating the volumes in induction chamber 40 above and below funnel 48 to equalize pressures therein. Thus in operation valve 44 is opened and granular solids are introduced to form mass 51. With valve 44 closed and valve 47 open, conveyance fluid is pressured into induction chamber 40 causing a cocurrent flow of conveyance fluid and granular solids through and from solid mass 51 by gravity through funnel inlet 48 into inlet section 49 and subsequently through conveyance conduit 41. By employing a series of successively larger cylindrical sections 41a, 41b and 41c, the conveyance force of the depressuring fluid is maintained substantially constant throughout the length of conveyance zone 41. Surrounding discharge opening 52 of conveyance zone 41 is separator chamber 42 provided with thrust plate 53 disposed immediately opposite the discharge opening. A thrust force of direction counter to that of solids flow in the conveyance conduit is exerted against the granular solids discharging and serves to maintain the granular solids in substantially compact form. The conveyance fluid and granular solids are separated in chamber 42 and the conveyance fluid is removed via line 54 controlled by valve 55 while the granular solids are removed via line 56 controlled by valve 57. A variable orifice 58 is provided tube 56 to control the flow rate of granular solids discharging from separator chamber 42 thus allowing thrust plate 53 to establish the reverse thrust forces previously described.

In operation the granular solids flow rate of the apparatus of Figure 2 is intermittent, induction chamber 40 being alternately filled and emptied with and of granular solids. If desired, two or more similar apparatuses may be employed to deliver a constant granular solids flow in a combination apparatus such as that shown in Figure 1.

Referring now more particularly to Figure 3, a detail elevation view of an induction chamber is shown in which another modification of conveyance zone inlet section is employed. In this modification, induction chamber 60 is provided with conical bottom 61, solids inlet 62 controlled by valve 63, conveyance fluid inlet 64 controlled by valve 65, and a conveyance conduit 66 extending through the upper surface of the induction chamber down to and opening into induction chamber 60 at a point adjacent the conical bottom. Conveyance conduit 61 is provided with inlet section 67 having opening 68 through which granular solids may flow by gravity. The angular curvature of inlet section 67 measured from a horizontal reference is desirably greater than the angle of repose of the granular solids being handled and preferably is about 90° for vertical conduits and this curvature may be between the angle of repose and 180°. In the drawing the angular curvature is about 120°. Opening 68 may be restricted in which it is desired to increase the conveyance fluid velocity therethrough thus enhancing the tendency of the conveyance fluid to move granular solids therethrough.

Referring now more particularly to Figure 4, a further modification of inlet section is shown in which the conveyance conduit is disposed outside of the induction chamber as is the inlet section described above. In Figure 4, vessel 70 represents a column from which granular solids are to be removed. Conduit 71 controlled by valve 72 is provided for the introduction of a conveyance fluid into the bottom of vessel 70. Conveyance zone 73 through which the granular solids are conveyed communicates with return bend inlet section 74 which in turn communicates with funnel inlet opening 75. The granular solids thus collect in funnel 75, flow by gravity into the inlet opening 76 of inlet section 74 and thence are redirected through inlet section 74 cocurrently with a flow of depressuring conveyance fluid into conveyance section 73 for transportation therethrough. This particular modification is advantageous when it is possible to depressure granular solids directly from the vessel in which they exist. If desired, vessel 70 may comprise an induction chamber from which the granular solids are removed at the bottom rather than by means of a return bend inlet section within the induction chamber and with a portion of the conveyance section extending through the top of the induction chamber as shown in Figures 1, 2, 3 and 6.

Referring now more particularly to Figure 5, a second modification of separator chamber is shown in which a thrust plate is replaced by a static or dead bed of solids which exert a counter thrust force to maintain the granular solids in compact form. In Figure 5 separator chamber 80 is provided with expansion section 81 immediately surrounding the discharge opening 82 of conveyance conduit 83. Expansion chamber 81 is of greater cross sectional area than the discharge opening 82 whereby the conveyance forces of the depressuring conveyance fluid are reduced to values insufficient to convey granular solids therein. A net gravitational force exists in the opposite direction which effectively throttles the discharge rate of granular solids from opening 82. Guard plate 84 is to prevent, during upset operating conditions, the introduction of granular solids into conveyance fluid outlet 85 which in turn is controlled by valve 86. Outlet conduits 87 are provided from expansion chamber 81 through which the granular solids discharge at a rate controlled by the adjustment of variable orifices 88. The granular solids are subsequently removed from separator chamber 80 via line 90 controlled by valve 91.

Referring now more particularly to Figure 6, a detail elevation view in cross section of an intermediate pressuring vessel similar to that shown as element 26 in Figure 1 is given. Intermediate pressuring vessel 100 surrounds the discharge portion of lower conveyance conduit 101 and the lower portion of upper conveyance conduit 102, the lower conveyance conduit 101 having discharge opening 103 discharges into expansion chamber 104 in the upper extremity of vessel 100 forming a dead bed of solids therein beneath guard plate 105. Granular solids pass from expansion chamber 104 via line 106 into mass 107 of granular solids disposed above inlet funnel 108. While vessel 100 is being filled with granular solids from lower conveyance conduit 101, conveyance fluid is removed via line 109 controlled by valve 110. Subsequently conveyance fluid is introduced via line 109 and passes cocurrently with granular solids from mass 107 through funnel inlet 108 by gravity and then is redirected through return bend inlet section 111 into the lower portion of lower conveyance conduit 102 wherein the conveyance fluid depressures cocurrently with granular solids. Pressure equalizing tube 112 is provided communicating the volumes above and below funnel inlet 108. Lower conveyance conduit 101 communicates with an induction chamber not shown while upper conveyance conduit 102 communicates with a separator chamber not shown. Thus cyclically pressuring and depressuring conveyance fluid into and out of intermediate pressuring vessel 100, the chamber will alternately fill and empty itself of granular solids thus effecting a conveyance thereof through lower conveyance conduit 101 and subsequently through upper conveyance conduit 102.

Another modification of the discharge outlet or separator zone used with the conveyance apparatus is shown in Figures 7 and 8 in which a return bend 120 is provided through which solids discharging from conveyance conduit 121 pass and are introduced into solids distributing conduit 122 within the top of vessel 123. Conduit 122 is provided with solids restriction 124 shown more clearly in Figure 8 and with openings 125 through which solids and conveyance fluid discharge uniformly regardless of the position of solids level 126 in vessel 123. Outlet conduit 127 controlled by valve 128 is provided for the removal of conveyance fluid. In Figure 8 a cross section view of solids restriction 124 is shown in which a coarse mesh screen 129 or individual bars placed at angles to each other are disposed in conduit 122 for the purpose of restricting the flow of solids to generate the thrust force referred to previously which is required to maintain the solids in substantially compact form in the system. Such a restriction 124 does not appreciably restrict the flow of conveyance fluid however. In one modification in a schedule 10 pipe of 4-inch nominal diameter the restriction was composed of 4 one-quarter inch rods extending through the axis of the pipe and placed at 45° angles to each other. This performed adequately and maintained the solids in compact condition.

The element of the present invention which is included in all of the foregoing description lies in the inlet section to the conveyance conduits by means of which granular solids are adapted to flow by gravity into an inlet opening of the inlet section and within which they are redirected so as to flow into the conveyance conduit communicating with the inlet section and are maintained in substantially compact form throughout the inlet section and the conveyance conduit.

The following examples illustrate the performance of the conveyance process and apparatus of the present invention as a function of the various types of inlet section attached to the conveyance conduit. It is to be understood, however, that the particular granular solids being transported are merely illustrative of the method and are not intended to limit the present invention to a particular type of granular solids, nor are the examples intended to limit the conveyance fluid to a particular medium but rather to illustrate the performance of the particular improvement of this invention.

Example I

A vertical conveyance conduit 3 inches in diameter and 20 feet high was provided with a circular restriction 1 inch in diameter at its inlet opening and was found to have a capacity of 2460 pounds per hour of synthetic bead cracking catalyst which had a bulk density of 48.2 pounds per cubic foot. The conveyance fluid was air depressured from 20 pounds per square inch gauge to atmospheric pressure.

Example II

The conveyance conduit of Example I was provided with an inlet restriction 1½ inches in diameter and the conveyance rate under similar conditions to those in Example I was found to be 3820 pounds per hour.

In both of the foregoing examples inlet opening of the restriction was in a horizontal plane and opened downward so that the granular solids could not flow by gravity into the inlet opening.

Example III

The 3-inch conveyance conduit of Example I was provided with an arcuate inlet section comprising a 3-inch 120° weld-ell of circular cross section similar to that shown in Figure 3 and into the opening of which solids could flow by gravity. Under the same conveyance conditions of the foregoing two examples the maximum flow rate of synthetic bead catalyst was found to be 14,400 pounds per hour.

Example IV

The conveyance conduit was then provided with a return bend of 180° (similar to that shown in Figure 2) and a 60° funnel. Under like conveyance conditions of the previous three examples a flow rate of 36,000 pounds per hour was obtained. This is, however, not a maximum capacity of the conveyance inlet section but was limited by other operating conditions.

Example V

The same inlet section as employed in Example IV but without the funnel attached to the inlet opening of the inlet section (return bend) gave a granular catalyst flow rate of from 28,000 to 30,000 pounds per hour compared to 36,000 pounds per hour with a funnel inlet.

The foregoing examples indicate the pronounced effect of the inlet section which is adapted to the gravity introduction of granular solids.

In the present specification the reference to substantially compact granular solids is intended to mean granular solids in that state of compaction in which the average bulk density in pounds of solids per cubic foot of occupied volume is substantially the same as the bulk density of the granular solids when unaerated or unagitated and at rest. It is to be understood that the condition of the granular solids during conveyance by the method and through the apparatus of the present invention is one in which the granular solids are not free to move with respect to one another as they are in systems employing a suspension of granular solids in a suspending fluid. It is this characteristic of the method of the present invention which materially decreases the attrition rate of the granular solids being handled and permits the radical increased volumetric capacities of the apparatus of this invention.

Although the present invention as herein described in connection with the invention of granular solids through a contacting process, namely a catalytic cracking process, it is to be understood that this is not intended as a limitation but merely illustrative of one application of the present method which is applicable generally to the conveyance of any granular solids with any conveyance fluid in any solids transportation operation.

In the present specification the term "redirecting" as applied to the movement of solids through the solids inlet zone is intended to indicate the change in direction of solids flow from a direction of gravity flow to the direction of flow maintained in said conveyance conduit.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. A method for the conveyance of granular solids which comprises establishing an elongated conveyance zone, flowing granular solids by gravity into the inlet opening of said conveyance zone, passing a conveyance fluid into said inlet opening, depressuring said conveyance fluid cocurrently through granular solids within said conveyance zone to convey said solids therethrough, maintaining said solids at substantially the same bulk density as when at rest throughout said conveyance zone by applying a thrust force to the conveyed solids discharging from the outlet opening of said conveyance zone, and separating conveyance fluid from the discharged conveyed solids.

2. A method for the conveyance of granular solids which comprises establishing an inlet zone communicating with an elongated conveyance zone, introducing granular solids in substantially compact form downwardly by gravity into said inlet zone, passing a conveyance fluid into said inlet zone under pressure relative to that at the outlet of said conveyance zone thereby cocurrently depressuring said conveyance fluid with said granular solids successively through said inlet zone and said conveyance zone, maintaining said granular solids at all points within said inlet and conveyance zones as a continuous moving mass of granular solids at a bulk density substantially equal to the solids' bulk density when at rest by applying a thrust force against the solids discharging from the discharge opening of said conveyance zone, and separating the conveyance fluid from the thus conveyed solids.

3. A method for the transportation of granular solids which comprises establishing an elongated conveyance zone communicating with an inlet zone, passing granular solids downwardly into said inlet zone by gravity flow, introducing a conveyance fluid into said inlet zone cocurrently with said solids, redirecting said granular solids by gravity and the depressuring conveyance fluid through said inlet zone into said conveyance zone, depressuring said conveyance fluid cocurrently through a continuous compact moving mass of granular solids maintained at a bulk density substantially equal to the at rest bulk density of the solids within said conveyance zone by the step of applying a thrust force to the granular solids flowing from said conveyance zone, and removing said conveyance fluid from said conveyance zone.

4. A method for the conveyance of granular solids which comprises establishing an elongated conveyance zone communicating through an arcuate inlet zone with an induction zone, introducing granular solids into said induction zone, introducing a conveyance fluid under pressure into said induction zone, passing granular solids downwardly by gravity from said induction zone into said inlet zone, redirecting the flow of granular solids through an arcuate path in said inlet zone by means of gravity and the depressuring of said conveyance fluid into said conveyance zone, maintaining the granular solids in said induction zone, said inlet zone and said conveyance zone at all points as a continuous moving substantially compact mass of granular solids at a bulk density substantially equal to the bulk density of said solids when at rest by applying a thrust force to solids discharging from said conveyance zone, depressuring a sufficient quantity of said conveyance fluid through said conveyance zone to counteract forces of friction and gravity exerted on the granular solids contained therein thereby conveying said solids therethrough, maintaining conveyance forces within said conveyance zone at a reasonably constant value throughout said zone, discharging granular solids from said conveyance zone cocurrently with said conveyance fluid, and separating the depressured conveyance fluid from the thus conveyed solids.

5. A method according to claim 4 in combination with the step of discharging granular solids into a separator zone from said conveyance zone, removing depressured conveyance fluid from said separator zone, and removing conveyed solids from said separator zone.

6. In a process for the conveyance of granular solids wherein a continuous substantially compact moving mass of granular solids is conveyed through a conveyance zone at a bulk density substantially equal to the bulk density of the solids at rest cocurrently with a depressuring conveyance fluid and a thrust force is applied to the solids discharging therefrom to maintain said solids' bulk density, the improved steps which comprise establishing an inlet zone communicating with said conveyance zone, passing compact unfluidized granular solids by gravity into said inlet zone, introducing a conveyance fluid into said inlet zone, and redirecting the flow of granular solids through said inlet zone under the influence of gravity and the conveyance force of said depressuring conveyance fluid into said conveyance zone.

7. In a process for the conveyance of granular solids wherein a conveyance fluid is depressured through an elongated conveyance zone cocurrently with a continuous moving mass of substantially compact granular solids, the improved steps which comprise establishing an arcuate inlet zone communicating with the inlet opening of said conveyance zone, passing compact unfluidized granular solids to be conveyed downwardly by gravity into said inlet zone, introducing a conveyance fluid thereinto, redirecting the flow of granular solids through said inlet zone into said conveyance zone, and cocurrently depressuring a conveyance fluid with said solids through said inlet zone and said conveyance zone successively while maintaining said solids substantially at their at rest bulk density by applying a thrust force to the solids discharging from said conveyance zone.

8. A method for conveying granular solids through a conveyance zone which comprises maintaining an accumulation of said solids at the inlet of a conveyance zone, passing a conveyance fluid through said conveyance zone so as to convey said solids cocurrently with said conveyance fluid from said inlet to the outlet of said conveyance zone, applying a compacting force at said outlet so as to maintain the solids at a bulk density substantially equal to the bulk density of the solids when at rest at said outlet and throughout said conveyance zone, and removing said solids and said conveyance fluid from said outlet, said solids being passed from said accumulation in a direction of gravity flow and redirected thereafter in a redirection zone prior to entering the inlet of the conveyance zone.

9. A method for the transportation of granular solids through a conveyance zone through which they would not flow in the same direction under the influence of gravity alone which comprises passing granular solids downwardly into an inlet zone by gravity flow, redirecting said granular solids by gravity and a depressuring conveyance fluid through said inlet zone into an elongated conveyance zone, depressuring said conveyance fluid cocurrently through a continuous substantially compact moving mass of granular solids maintained at a bulk density substantially equal to the bulk density of the solids when at rest within said conveyance zone, and discharging granular solids and said conveyance fluid from said conveyance zone.

10. A method for the conveyance of granular solids which comprises establishing a first conveyance zone provided with a first arcuate inlet zone, an intermediate pressuring zone communicating with the outlet of said first conveyance zone, and a second conveyance zone provided with a second arcuate inlet zone communicating with said intermediate pressuring zone, introducing unfluidized granular solids into said first inlet zone by gravity, passing a conveyance fluid into said inlet zone, redirecting the flow of said granular solids through an arcuate path in said first inlet zone into said first conveyance zone, depressuring said conveyance fluid cocurrently with said solids successively through said first inlet and conveyance zones, discharging depressured conveyance fluid and conveyed granular solids into said intermediate pressuring zone at least partially filling said intermediate pressuring zone with unfluidized discharged solids from said first conveyance zone, subsequently pressuring a conveyance fluid into said intermediate pressuring zone, flowing the unfluidized solids by gravity into the inlet opening of said second inlet zone, redirecting the flow of said solids through an arcuate path in said second inlet zone into said second conveyance zone, depressuring said conveyance fluid cocurrently with said granular solids through said second conveyance zone, discharging granular solids and depressured conveyance fluid from said second conveyance zone, applying a thrust force to solids discharging from each of said conveyance zones to maintain the solids therein during conveyance substantially at said at rest bulk density, and cyclically pressuring and depressuring said conveyance fluid into and out of said intermediate pressuring zone to alternately raise the pressure thereof above that of the outlet of said second conveyance zone and then lower the pressure thereof below that of said first inlet zone to establish an intermittent discharge of compact unfluidized granular solids from said second conveyance zone.

11. A method according to claim 10 in combination with the steps of establishing an induction zone communicating with said first inlet zone, establishing a separator zone communicating with the discharge opening of said second conveyance zone together with the steps of introducing granular solids to be conveyed by gravity into said induction zone, introducing said conveyance fluid under pressure into said induction zone, removing conveyed granular solids from said separator zone, and removing a depressured conveyance fluid from said separator zone.

12. An apparatus for the conveyance of granular solids which comprises an elongated conveyance conduit communicating at its inlet end with an arcuate inlet conduit, means for flowing granular solids by gravity into the opening of said inlet conduit, means for introducing a conveyance fluid into said inlet conduit, means for depressuring a conveyance fluid cocurrently with said granular solids through said inlet and conveyance conduits successively, means for applying a thrust force to solids discharging from the outlet opening of said conveyance conduit thereby maintaining granular solids therein in substantially compact form and at a bulk density substantially equal to the bulk density of said solids when at rest, and means for separating conveyed granular solids from said conveyance fluid discharged from said conveyance conduit.

13. An apparatus according to claim 12 wherein said conveyance conduit is tapered having an increasing cross sectional area in the direction of granular solids flow.

14. An apparatus according to claim 12 wherein said conveyance conduit comprises a plurality of connected conduit sections of uniform cross sectional area, each of said sections in the direction of granular solids flow having a larger cross sectional area than the preceding one.

15. An apparatus according to claim 14 wherein said conveyance conduit comprises an interconnected plurality of tubular conduit sections, said sections being of successively increased diameter in the direction of solids flow.

16. An apparatus for the conveyance of granular solids which comprises an elongated conveyance conduit communicating an induction chamber with a separation chamber, inlet means for granular solids and inlet means for a conveyance fluid into said induction chamber, outlet means for granular solids and outlet means for conveyance fluid from said separation chamber, means for restricting the discharge of granular solids from said conveyance conduit to apply a thrust force to the discharging solids and thereby maintain said solids throughout said conveyance conduit at a bulk density substantially equal to the bulk density of said solids at rest, and an inlet conduit communicating with said conveyance conduit adapted to the gravity flow of solids thereinto from said induction chamber.

17. An apparatus for the conveyance of granular solids which comprises an elongated conveyance conduit communicating at its inlet with an induction chamber and at its outlet with a separation chamber, means for separately introducing granular solids and a conveyance fluid into said induction chamber, means to raise the pressure of said induction chamber to a value substantially above that of said separator chamber, means for separately removing granular solids and conveyance fluid from said separation chamber, means for restricting the solids discharge from said conveyance conduit and adapted to maintain the solids therein at a bulk density substantially equal to the at rest bulk density, an arcuate inlet conduit of substantially the same diameter as and communicating with the inlet opening of said conveyance conduit, said inlet conduit being provided with an inlet opening into said induction chamber and adapted to receive granular solids by gravity therefrom, said induction chamber, inlet conduit, conveyance conduit and separation chamber being so adapted for depressuring a conveyance fluid successively therethrough cocurrently with said granular solids maintained substantially at their at rest bulk density.

18. An apparatus according to claim 17 wherein said inlet opening of said inlet conduit is provided with a funnel member adapted to receive granular solids to be conveyed.

19. An apparatus according to claim 17 wherein said inlet conduit comprises an arcuate conduit of substantially the same cross sectional area as the inlet opening of said conveyance conduit, said inlet conduit having an inlet opening adapted to the gravity flow of granular solids thereinto from said induction chamber and an outlet opening integral with the inlet opening of said conveyance conduit.

20. An apparatus according to claim 19 in which an inlet opening of said inlet conduit is provided with a retriction reducing the inlet opening cross sectional area to between about 5% and about 50% of the cross sectional area of the inlet opening of said conveyance conduit.

21. An apparatus for the conveyance of granular solids which comprises a cylindrical induction chamber, a funnel member within said induction chamber intermediate its ends, an arcuate conduit of substantially circular transverse area integrally attached at one end to the lower opening of said funnel member, a tubular conveyance conduit integrally attached to the other end of said arcuate conduit, an inlet conduit into said induction chamber above said funnel member and adapted to the introduction of granular solids into said funnel, an inlet conduit above said funnel member for introducing a conveyance fluid under pressure into said induction chamber at a point above the solids therein, means for raising the pressure of said induction chamber to a value substantially above the pressure of the outlet of said conveyance conduit, means for restricting the discharge of granular solids from the outlet of said conveyance conduit and adapted to prevent granular solids fluidization therein and thereby maintain said solids during conveyance at substantially the same bulk density as the bulk density of said solids when at rest, and means for maintaining a uniform pressure above and below said funnel member within said induction chamber.

22. An apparatus according to claim 21 in combination with a second arcuate conduit integral with said conveyance conduit at its discharge extremity and opening into a solids distributing conduit, means for disengaging granular solids and conveyance fluid from said distributing conduit, and means therein for restricting granular solids flow but not conveyance fluid flow therethrough.

23. In an apparatus for the conveyance of granular solids by means of a depressuring conveyance fluid and having an elongated conveyance conduit communicating a solids induction chamber with a separator chamber, the improvement which comprises an arcuate inlet conduit connecting the solids outlet opening of said induction chamber with the inlet opening of said conveyance conduit, said arcuate conduit being adapted to gravity flow of solids thereinto from said induction chamber, and means adjacent the outlet opening of said conveyance conduit for applying a thrust force to solids discharging therefrom thereby maintaining the moving solids therein in a substantially compact and unfluidized form and at a bulk density substantially equal to the bulk density of the solids when at rest.

24. In an apparatus for the conveyance of granular solids by means of a depressuring conveyance fluid and having an elongated conveyance conduit communicating a solids induction chamber with a separator chamber, the improvement therein which comprises an arcuate inlet conduit connecting the solids outlet opening at the bottom of said induction chamber with the inlet opening of said conveyance conduit, said arcuate conduit being adapted to gravity flow of solids thereinto from said induction chamber, an inlet conduit for solids into said induction chamber and adapted to form a compact bed of unfluidized solids therein submerging the inlet opening of said arcuate inlet conduit, an inlet conduit into said induction chamber at a point above the solids bed therein for a conveyance fluid, and means adjacent the outlet opening of said conveyance conduit for applying a thrust force to solids discharging therefrom thereby maintaining the moving solids therein in a substantially compact and unfluidized form, that is, at a bulk density substantially equal to the bulk density of the solids when at rest.

25. In an apparatus for the conveyance of granular solids by means of a depressuring conveyance fluid and having an elongated conveyance conduit receiving solids for conveyance from an induction chamber and discharging solids into a separator chamber, the improvement which comprises an arcuate inlet section communicating said induction chamber at its outlet with the inlet opening of said conveyance conduit, a funnel member positioned within said induction chamber and adapted to receive solids to be conveyed and to deliver them by gravity into said arcuate inlet conduit, said arcuate conduit being adapted to the gravity flow thereinto of solids from said funnel member and to submerge the inlet opening thereof with a bed of compact unfluidized solids contained in said funnel member, means for introducing a conveyance fluid under pressure into said induction chamber at a point above the solids therein, and means adjacent the outlet of said conveyance conduit adapted to restrict the discharge of solids therefrom to thereby prevent fluidization of solids therein and maintain said solids thereby during conveyance at a bulk density substantially equal to the bulk density when at rest.

26. An apparatus for conveying granular solids through a conveyance zone which comprises means for maintaining an accumulation of said solids at the inlet of a conveyance conduit, means for passing a conveyance fluid through said conveyance conduit so as to convey said solids concurrently with said conveyance fluid from said inlet to the outlet of said conveyance conduit, means for applying a compacting force at said outlet so as to maintain the solids in substantially compact bed form and at a bulk density substantially equal to the bulk density of the solids when at rest at said outlet and throughout said conveyance conduit, and means for removing said solids and said conveyance fluid from said outlet, said means for maintaining an accumulation of solids comprising an induction chamber and redirection means, the redirection means comprising means for permitting said solids to flow out of said induction chamber in a direction of gravity flow and means for thereafter redirecting the solids into the inlet of said conveyance conduit.

27. In an apparatus for the conveyance of granular solids by means of a depressuring conveyance fluid and having an induction chamber communicating through a plurality of serially connected conveyance conduits with a separator chamber, each adjacent pair of said conduits being interconnected by means of an intermediate pressuring chamber, the improvement which comprises an arcuate inlet conduit adapted to gravity flow of solids thereinto from said induction chamber and opening into the first of said conveyance conduits, an arcuate inlet conduit adapted to gravity flow of solids thereinto from each of said intermediate pressuring chambers and opening into the next of said plurality of conveyance conduits, separate means within each of said intermediate pressuring chambers and within said separator chamber adapted to restrict solids discharge therefrom and maintain solids during conveyance therethrough at a bulk density substantially equal to the bulk density of said solids when at rest, inlet conduits for conveyance fluid and solids to be conveyed opening into said induction chamber, a conduit for conveyance fluid opening into said intermediate pressuring chambers above the solids level therein, outlet conduits for depressured conveyance fluid and conveyed solids from said separator chamber, and means for alternately pressuring and depressuring each of said intermediate pressuring chambers to pressures above and below the next and prior intermediate pressuring chambers respectively in succession to effect the conveyance of substantially compact unfluidized granular solids at their at rest bulk density from said induction to said separator chamber.

28. An apparatus according to claim 27 wherein each of said arcuate inlet conduits is provided with a funnel member adapted to receive solids to be conveyed and to deliver them by gravity into said arcuate inlet conduit.

References Cited in the file of this patent

UNITED STATES PATENTS

| Number | Name | Date |
|---|---|---|
| 727,030 | Tilghman | May 5, 1903 |
| 788,741 | Trump | May 2, 1905 |
| 1,846,069 | Schaub | Feb. 23, 1932 |
| 1,898,356 | Fickey | Feb. 21, 1933 |
| 2,123,537 | Marr | July 12, 1938 |
| 2,398,759 | Angeli | Apr. 23, 1946 |
| 2,509,983 | Morrow | May 30, 1950 |
| 2,509,984 | Morrow | May 30, 1950 |
| 2,524,919 | Meincke | Oct. 10, 1950 |

FOREIGN PATENTS

| Number | Country | Date |
|---|---|---|
| 180,397 | Great Britain | May 11, 1922 |
| 268,667 | Great Britain | Apr. 7, 1927 |